Patented Oct. 3, 1939

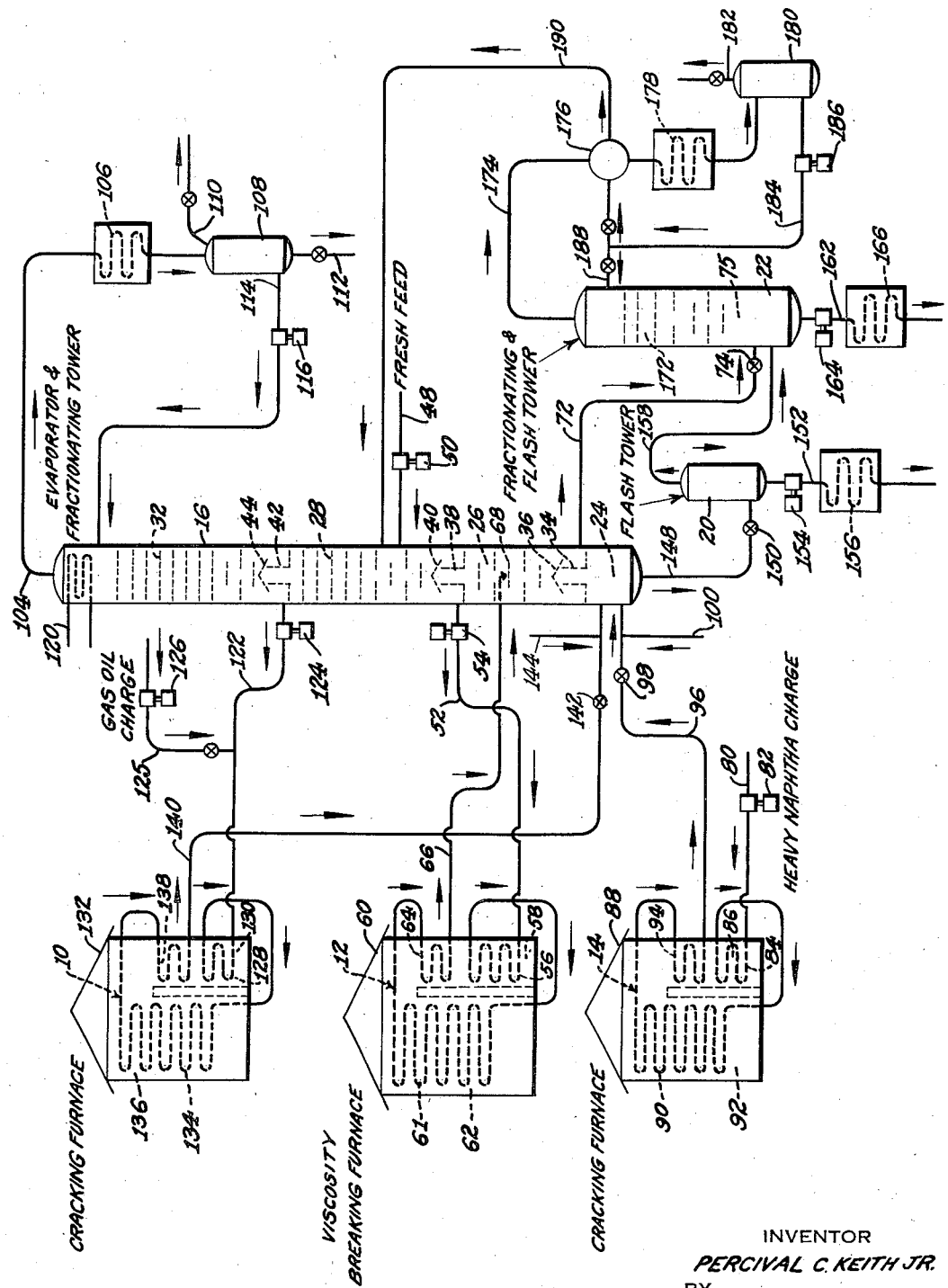

2,174,858

UNITED STATES PATENT OFFICE 2,174,858

PROCESS OF TREATING HYDROCARBON OIL

Percival C. Keith, Jr., Peapack, N. J., assignor to Gasoline Products Company, Inc., Newark, N. J., a corporation of Delaware Application July 22, 1937, Serial No. 154,961

3 Claims. (Cl. 196—48)

This invention relates to improvements in the art of converting higher-boiling hydrocarbons into lower-boiling hydrocarbons.

In accordance with my invention a heavy charging stock such as topped or reduced crude is subjected to a primary cracking operation and the resultant cracked products are brought into contact with separated vapors, derived from a higher temperature cracking operation, in a contacting or dephlegmating zone so that the vapors from the higher-temperature cracking zone assist in the distillation of the cracked heavy stock. Thus a cycle condensate obtained in fractionating vapors derived from both of the cracking steps is subjected to cracking and the cracked products introduced into a separating zone, the separated vapors from which flow to the contacting or dephlegmating zone into which the cracked products produced in cracking the heavy charging stock are introduced.

In one method of operation contemplated by the invention, the heavy charging stock is introduced into a primary fractionating zone and the resultant unvaporized charging stock and reflux condensate is passed through the primary cracking coil and the cracked products discharged into the dephlegmating or contacting zone receiving vapors separated out from the higher temperature cracking operation. A clean reflux condensate is withdrawn from a secondary fractionating zone and directed to the higher temperature cracking zone, the resultant cracked products being passed into an evaporating or separating zone to separate vapors from cracked residue, the separated vapors being directed into the contacting or dephlegmating zone to be contacted with the products of the primary cracking operation whereby vapors are separated from a liquid residue.

The liquid residue is passed to a flash zone under lower pressure to further vaporize some of the liquid residue and to separate vapors from a viscosity-broken tar. The vapors from the separating or dephlegmating zone together with vapors from an evaporator zone later to be described are passed through the primary and secondary fractionating zones and fractionated to separate light vapors from a condensate oil, the lighter vapors being condensed to form a distillate which is a light motor fuel such as gasoline.

The condensate oil is passed through a main cracking zone maintained under high-temperature and high-pressure conditions in order to effect the desired extent of cracking. The stream of cracked products leaving the main cracking zone is passed to the evaporator zone under lower pressure wherein hot vapors are separated from cracked residue, the hot vapors being passed to the dephlegmating zone as above described. The cracked residue is collected in the evaporator zone and may be mixed with a naphtha cracked residue as will be now described, but the naphtha cracking operation may be omitted.

A naphtha charge may be passed through a cracking and reforming zone in order to crack and reform the naphtha. The stream of cracked products leaving the cracking and reforming zone is passed to the evaporator zone under lower pressure to separate hot vapors from a cracked residue. The cracked residue or residues as above mentioned are collected in the evaporator zone and passed under lower pressure to a second flash zone where further vaporization of the cracked residue or residues takes place and a separation into vapors and a cracked tar residue occurs.

The vapors from the second flash zone are passed to the first flash zone where they contact and vaporize some of the liquid residue separated from the stream of cracked products from the viscosity-breaking zone.

The vapors from the first flash zone are fractionated to form lighter vapors which are condensed and the distillate may be used as reflux in the fractionating zones in the process.

From the foregoing it will be seen that two types of tar are collected, one being the viscosity-broken tar and the other being the cracked tar residue.

In another form of the invention the heavy charging stock may be passed directly to the viscosity-breaking coil and a single condensate cut withdrawn from either the primary or secondary fractionating zone may be passed to the main cracking coil; or two condensate cuts may be made, the lighter from the secondary fractionating zone and the heavier from the primary fractionating zone. The lighter cut may be passed through the main cracking zone and the heavier cut may be passed through the viscosity-breaking coil or through a separate coil maintained under mild cracking conditions wherein the heavier oil is subjected to viscosity-breaking conditions. The products resulting from the cracking operations are treated as above described in connection with the first form of the invention to separate vapors having the desired boiling range.

Other features and advantages of the invention will be apparent from the following detailed description taken in connection with the drawing which represents a diagrammatic flow sheet of apparatus suitable for practicing the invention.

In the drawing the principal parts of the apparatus comprise a main cracking zone or coil 10, a viscosity-breaking zone or coil 12, a cracking and reforming zone or coil 14, a combined high pressure evaporator and fractionating tower 16, a flash tower 20 and a combined fractionating and flash tower 22. Suitable pipes, pumps and other means are included in the apparatus which cooperate with the main parts of the apparatus as will be apparent to those skilled in the art.

The combined high pressure evaporator and fractionating tower 16 comprises an evaporator zone 24, a separating zone 26, a primary fractionating zone 28 and a secondary fractionating zone 32. The evaporator zone 24 and separating zone 26 are separated by a trap-out tray 34 having a hood 36. The separating zone 26 and the primary fractionating zone 28 are separated by a trap-out tray 38 having a hood 40. The primary fractionating zone 28 and the secondary fractionating zone 32 are separated by a trap-out tray 42 having a hood 44.

A fresh relatively heavy oil stock, such as reduced crude oil or other heavy oil to be cracked is passed through line 48 by pump 50. The heavy oil stock, preferably preheated in any suitable manner, is passed to the primary fractionating zone 28 of the combined evaporator and fractionating tower 16. The introduced heavy oil contacts the hot vapors passing upwardly from the evaporator zone 24 and the separating zone 26 as will be later explained, and some of the lighter constituents of the heavy oil are vaporized and pass upwardly into the primary and secondary fractionating zones 28 and 32 along with the other vapors therein to be fractionated into desired fractions and to have heavy constituents separated therefrom. Some of the hot vapors within the primary fractionating zone 28 are condensed and flow down as heavy reflux condensate.

The unvaporized portions of the heavy oil and heavy reflux condensate are collected at the bottom of the primary fractionating zone 28 on trap-out tray 38. The liquid collected on this trap-out tray 38 is a heavy oil which is withdrawn therefrom through line 52 and is passed by pump 54 through a preheating coil 56 extending through the cooler portion of a convection section 58 of a furnace 60 and then passed through the first portion 61 of the cracking zone or coil 12 extending through the radiant section 62 of the furnace 60. The latter portion 64 of the cracking zone or coil 12 extends through the convection section 58 of the furnace 60. The cracking zone 12 is maintained under mild cracking conditions adapted to subject the heavy oil to a viscosity-breaking treatment to reduce the viscosity of the oil.

The oil leaves the cracking zone 12 through line 66 and is preferably conducted to the baffle plates 68 above the trap-out tray 34 in the separating zone 26 of the combined evaporator and fractionating tower 16. If desired, the oil leaving the cracking zone 12 may be passed directly to the trap-out tray 34. The viscosity-broken oil is introduced into the separating zone 26 without a substantial reduction in pressure but there is a separation into vapors and liquid residue. If desired, the viscosity-broken oil may be passed to the separating zone 26 under lower pressure to effect additional vaporization thereof. The unvaporized portions of the viscosity-broken oil are partially vaporized by contact with the hot cracked vapors passing upwardly from the evaporator zone 24, the hot vapors being released from cracked products coming from one or more cracking zones and introduced into the evaporator zone 24 as will be later described.

The unvaporized portions of the viscosity-broken oil which collect on the trap-out tray 34 are withdrawn through line 72 having a pressure reducing valve 74 and introduced into the flash zone 75 of the combined flash and fractionating tower 22 where further vaporization of the oil takes place and a tar residue is obtained. The tar residue is collected on the bottom of the flash zone 75 of the combined fractionating and flash tower 22 and is separately collected as a tar as will be later described in more detail.

When naphtha stock is to be cracked and reformed, it is preferably preheated in any suitable manner and is passed through line 80 by pump 82, and then through a preheating coil 84 extending through the cooler portion of the convection section 86 of furnace 88. The preheated naphtha is then passed through the first portion 90 of the cracking zone or coil 14 extending through the radiant section 92 of the furnace 88 and then through the latter portion 94 of the cracking zone 14 extending through the convection section 86 of the furnace 88. The cracking zone is maintained under high-temperature and high-pressure conditions adapted to crack and reform the naphtha charge. During its passage through the cracking and reforming zone 14, the naphtha is subjected to a reforming operation to produce a stream of cracked products containing light constituents that have valuable anti-knock properties.

The stream of cracked products leaving the cracking zone 14 is passed through line 96 having a pressure reducing valve 98 into the evaporator zone 24 of the combined evaporator and fractionating tower 16 where a separation into hot vapors and a cracked residue occurs due to the reduction in pressure. In order to prevent coking of the charge passing from the cracking zone 14, I preferably add a quenching oil through line 100 before the stream of cracked products is introduced into the evaporator zone 24.

The hot vapors from the evaporator zone 24 of the combined evaporator and fractionating tower 16 pass upwardly into the separating zone 26 in a countercurrent direction to the viscosity-broken oil introduced into the separating zone 26 through line 66 to vaporize some of the oil and condense some of the heavy constituents in the vapors as reflux condensate. The hot vapors also contact and move past the trap-out tray 34 to heat the unvaporized portions of the viscosity-broken oil and reflux condensate and to vaporize some of the viscosity-broken oil and reflux condensate therein. The cracked residue mixed with the cracked residue separated from the stream of cracked products from the main cracking zone 10 as will be later described is collected on the bottom of the evaporator zone 24 of the combined evaporator and fractionating tower 16.

The vapors passing upwardly through the secondary fractionating zone 32 of the combined evaporator and fractionating tower 16 are subjected to further fractionation and lighter vapors having the desired end point are separated from insufficiently cracked products, the insufficiently cracked products being collected at the bottom of the secondary fractionating zone 32 in the trap-out tray 42 and returned to the main cracking zone 10 for further conversion. The fractionated vapors having the desired end point leave the top of the secondary fractionating zone 32 of the combined evaporator and fractionating tower 16 and are passed through line 104 and condensed by passing through condenser 106. The distillate is then passed to a drum or receiver 108 having a valved gas outlet 110 and a valved liquid outlet 112. The distillate collected in the drum or receiver 108 is a light motor fuel such as gasoline. A portion of the distillate may be withdrawn through line 114 and passed therethrough by pump 116 into the upper portion of the secondary fractionating zone 32 of the combined evaporator and fractionating tower 16 as reflux. A cooling coil 120 may be provided if additional cooling is desired for the top of the secondary fractionating zone 32.

The condensate oil collecting on the trap-out tray 42 is withdrawn and passed through line 122 by pump 124 through the main cracking zone or coil 10. If desired, a gas oil charge may be admixed with the stream of condensate oil passing through line 122, the gas oil charge being passed through line 125 by pump 126. The condensate oil is passed through a preheating coil 128 extending through the cooler portion of the convection section 130 of furnace 132. The preheated oil is then passed through the first portion 134 of the cracking zone or coil 10 extending through the radiant section 136 of the furnace 132, and is then passed through the latter portion 138 of the cracking zone or coil 10 which extends through the convection section 130 of the furnace 132. The cracking zone 10 is maintained under high-temperature and high-pressure conditions in order to bring about the desired cracking of the gas oil. The stream of cracked products leaves the cracking zone 10 through line 140 having a pressure reducing valve 142 and is introduced into the evaporator zone 24 above the point of introduction of the stream of cracked products leaving the reforming and cracking zone 14 through line 96. Before being passed into the evaporator zone 24 the stream of cracked products in line 140 is passed through reducing valve 142 and is then preferably quenched with oil passing through line 144.

The stream of cracked products from the cracking zone 10 is then passed into the evaporator zone 24 and due to the reduction in pressure there is a separation of the stream of cracked products into hot vapors and a cracked residue. The hot vapors mix with the hot vapors released from the stream coming from reforming and cracking zone 14 through line 96 and the mixed hot gases pass upwardly in countercurrent direction to the downwardly flowing viscosity-broken oil introduced into the separating zone 26 through line 66 to vaporize some of the viscosity-broken oil and to condense some of the heavy vapors to form reflux condensate. The hot vapors also move past and contact trap-out tray 34 to vaporize some of the unvaporized viscosity-broken oil and reflux condensate collected on the trap-out tray 34.

The cracked residue separated from the stream of cracked products from the cracking zone 10 collects on the bottom of the evaporator 24 where it is mixed with the cracked residue separated from the stream of cracked and reformed products coming from the reforming or cracking zone 14 through line 96. The mixed cracked residue is passed through line 148 having a pressure reducing valve 150 into the flash tower 20 where a further vaporization and a separation of a cracked tar residue takes place. The cracked tar, which is separated, collects on the bottom of the flash tower 20 and is withdrawn therefrom and passed through line 152 by pump 154. The cracked tar is then passed through cooler 156 and is collected as a separate tar. The naphtha cracking and reforming step may be omitted in which event only the cracked residue separated from the cracked products leaving cracking zone 10 is passed to the flash tower 20 for further treatment as just described.

The vapors leaving the top of the flash tower 20 are passed through line 158 into the flash zone 75 of the combined fractionating and flash tower 22. The vapors in passing upwardly in the combined fractionating and flash tower 22 are contacted with the heavy oil introduced through line 72 from trap-out tray 34 and in this way some of the lighter constituents of the heavy oil are vaporized. The tar collecting at the bottom of the flash zone 75 is withdrawn therefrom and is passed through line 162 by pump 164 and is then passed through a cooler 166. The cooled tar may then be passed to a suitable receiving drum or reservoir. From the foregoing it will be seen that two different types of tars are separately collected, one tar being collected in the flash zone 75 of the combined fractionating and flash tower 22 and the other tar being collected in flash tower 20. These tars may be used as desired either separately or in blending with other tars.

The vapors passing upwardly in the combined fractionating and flash tower 22 are fractionated in the fractionating section 172 thereof. The vapors leaving the top of the combined fractionating and flash tower 22 are passed through line 174, through heat exchanger 176, through condenser 178, and the distillate is then passed to a receiver or drum 180 having a valved gas outlet 182. The distillate is withdrawn from the bottom of the receiver or drum 180 and is then passed through line 184 by pump 186, a portion of the oil being passed through line 188 into the upper portion of the combined fractionating and flash tower 22 as reflux liquid. The other portion of oil is passed through heat exchanger 176 and line 190 into the primary fractionating zone 28 of the combined evaporator and fractionating tower 16 as reflux above the point of introduction of the relatively heavy oil charging stock introduced through line 48.

The oil introduced through line 190 is contacted with the hot vapors passing through the primary fractionating zone 28 and in this way some of the introduced oil is vaporized and some of the heavy vapors are condensed to form reflux condensate. The unvaporized portion of the oil and the reflux condensate are collected on trap-out tray 38 and mixed with the unvaporized portions of the heavy oil introduced through line 48, and the mixture is then passed through the cracking zone 12 where a mild cracking is effected to subject the oil to the viscosity-breaking treatment as above described.

In a modification of the invention the heavy charging stock such as topped or reduced crude may, instead of being introduced into the primary fractionating zone 28, be passed directly to cracking coil 12 wherein the oil may be subjected to a single-pass cracking operation. When employing this method of operation a single condensate cut may be withdrawn, as from either trap-out tray 38 or 42, and subjected to cracking in cracking coil 10 or the two condensate cuts may be made, the lighter cut being withdrawn from trap-out tray 42 and subjected to cracking in cracking coil 10, and the heavier cut withdrawn from trap-out tray 38 and either cycled to the viscosity-breaking coil 12, or cycled to a separate cracking coil, wherein the heavy condensate is subjected to cracking under viscosity-breaking conditions and the resultant viscosity-broken products directed into the separating chamber 26.

A typical operation contemplated by my invention will now be given but it is to be expressly understood that I am not limited thereto. A heavy charging oil stock such as a reduced crude oil is passed through line 48 and is preferably preheated to about 450° F. in any suitable manner. The preheated heavy oil charge is introduced into the primary fractionating zone 28 of the combined evaporator and fractionating tower 16 where it contacts hot vapors passing upwardly from the evaporator zone 24 and the separating zone 26 of the combined evaporator and fractionating tower 16. These hot vapors include the vapors separated from the streams of cracked products coming from the main cracking zone or coil 10 and the cracking and naphtha reforming zone or coil 14. Some of the reduced heavy oil charge is vaporized and the vapors pass upwardly with the other vapors in the primary and secondary fractionating zones 28 and 32 for fractionation therein, and a part of the hot heavy vapors which contacted the heavy oil are condensed to form heavy reflux condensate.

The unvaporized portions of the heavy oil and heavy reflux condensate are collected on the trap-out tray 38 at the bottom of the primary fractionating zone 28 and are passed through line 52 and through the cracking zone 12 which is maintained under such conditions of temperature, pressure and time of reaction as to produce a maximum amount of gas oil constituents adapted for cracking and a minimum yield of gasoline. The heavy oil enters the cracking zone 12 at about 750°-800° F., preferably at 760° F., and leaves the cracking zone 12 at about 840° F.-880° F., and during its passage therethrough is maintained at a pressure of about 200 to 600 pounds per square inch. The viscosity-broken oil is conducted, under lower pressure or without a substantial reduction in pressure, to the baffle plates 68 above the trap-out tray 34 positioned in the separating zone 26 of the combined evaporator and fractionating tower 16. The combined evaporator and fractionating tower 16 is maintained at a pressure of about 195–215 pounds per square inch.

Some of the viscosity-broken oil flowing downwardly and countercurrent to the rising hot vapors from the evaporator zone 24 and separating zone 26 is vaporized by contact therewith and some of the vapors are condensed to form reflux condensate. The unvaporized portions of the viscosity-broken oil and the reflux condensate collected on trap-out tray 34 are further partially vaporized by indirect contact with the hot vapors separated from the streams of cracked products introduced into the evaporator zone 24 below the trap-out tray 34.

The unvaporized heavy oil on the trap-out tray 34 is passed through line 72 having the pressure reducing valve 74 into the flash zone 75 of the combined fractionating and flash tower 22 where the pressure is reduced to substantially atmospheric or subatmospheric pressure and a further vaporization and separation into vapors and cracked tar residue takes place due to the reduction in pressure. The hot vapors passing through line 158 are introduced into the combined fractionating and flash tower 22 below the point of introduction of the stream of heavy liquid residue passing through line 72 from trap-out tray 34 and in this way further vaporization of the lighter constituents of the cracked tar residue is effected. The tar residue which collects on the bottom of the flash zone 75 of the combined fractionating and flash tower 22 is withdrawn through line 162 and is collected in a suitable receiver or drum after being suitably cooled.

The vapors passing through primary and secondary fractionating zones 28 and 32 are further fractionated to separate lighter vapors having the desired end point from condensate oil containing insufficiently cracked products. The vapors leaving the top of the combined evaporator and fractionating tower 16 are condensed and the distillate collected in receiver 108. The distillate is a light motor fuel such as gasoline.

The condensate oil is collected on trap-out tray 42 at the bottom of the secondary fractionating zone and is passed through line 122 to the main cracking zone or coil 10. A fresh gas oil charge passing through line 125 may be admixed with the condensate oil passing to the cracking zone 10. The cracking zone 10 is maintained under high-temperature and high-pressure conditions in order to effect the desired extent of cracking of the oil. The condensate oil enters the main cracking zone 10 under about 100 to 400 pounds per square inch pressure and during its passage through the cracking zone 10, the temperature of the oil is raised to about 850°-1000° F., preferably about 900° F.-950° F.

The stream of cracked products leaving the cracking zone 10 through line 140 is preferably at about 925° F. and at about 150 to 200 pounds per square inch pressure. The oil in line 140 is passed through pressure reducing valve 142 into the evaporator zone 24 of the combined evaporator and fractionating tower 16 and due to the reduction in pressure there is a separation of the cracked products in the evaporator zone 24 into hot vapors and a cracked residue, the cracked residue being collected on the bottom of the evaporator zone 24. The separated vapors pass upwardly in the evaporator zone 24 and separating zone 26 and are fractionated in the primary and secondary fractionating zones 28 and 32 of the combined evaporator and fractionating tower 16 to separate light vapors from condensate oil containing insufficiently cracked products as above described. The cracked residue collects on the bottom of the evaporator 24 and is mixed with the cracked residue separated from the stream of cracked products from the cracking and reforming zone 14 presently to be described.

The naphtha charge passing through line 80 is preferably preheated in any suitable manner and passed through the cracking and reforming zone 14 which is maintained under high-temperature and high-pressure conditions in order to bring about the desired conversion. The naphtha is preheated to about 200° F. to 300° F. and leaves the reforming and cracking zone 14 at about 950° F. to 1050° F. The pressure on the naphtha in the cracking and reforming zone 14 is maintained between about 600 and 800 pounds per square inch pressure and the cracked and reformed naphtha is passed through pressure reducing valve 98 into the evaporator zone 24 preferably beneath the point of introduction of the cracked products from the main cracking zone 10.

Due to the reduction in pressure, there is a separation into hot vapors and a cracked residue, the hot vapors passing upwardly in the evaporator zone 24 and separating zone 26 to be fractionated along with the other vapors separated from the stream of cracked products from cracking zone 10 as above mentioned. The cracked residue collects at the bottom of the evaporator zone 24. It will be noted that the point of introduction of the cracked products from the reforming zone 14 is below the point of introduction of the stream of cracked products from the main cracking zone 10 so that the hot vapors separated from the stream leaving the reforming and cracking zone 14 come into contact with and raise the temperature of the cracked residue separated from the stream of cracked products coming from the main cracking zone 10, and in this way bring about a further vaporization of the lighter constituents in the cracked residue separated from the stream of cracked products from the main cracking zone 10.

The cracked residues separated from the streams of cracked products coming from the main cracking zone 10 and the cracking and reforming zone 14 are collected on the bottom of the evaporator zone 24 and the mixture is passed through line 148 having a pressure-reducing valve 150 into the flash tower 20 maintained under atmospheric or subatmospheric pressure. By reducing the pressure, further vaporization occurs and a separation into vapors and a cracked tar takes place. The cracked tar is withdrawn from the bottom of the flash tower 20 and is then passed into a suitable receiver or collecting drum. In this way I obtain two different types of tars, the one being withdrawn from the bottom of the flash tower 20 and the other tar being withdrawn from the bottom of the combined fractionating and flash tower 22.

The cracked residue withdrawn from flash tower 20 through line 152 will be characterized in having a very low gravity and a low viscosity Thus, in a typical example of the invention the cracked tar withdrawn from flash tower 20 may have an A. P. I. gravity of 6 and a viscosity Furol at 122° F. of 25, and viscosity broken tar withdrawn from tower 22 may have an A. P. I. gravity of 11 and a viscosity Furol at 122° F. of 200. Certain fuel oil specifications call for 10-11 A. P. I. gravity and a viscosity not exceeding 200 Furol at 122° F. The viscosity broken fuel is well adapted for meeting this specification which can not be met by blending the two fuel oils.

The vapors released in the flash zone 75 of the combined fractionating and flash tower 22 are fractionated in the fractionating section 172 thereof to separate light vapors from heavy constituents. The vapors leaving the top of the combined fractionating and flash tower 22 are condensed, and a portion of the distillate is passed through line 188 into the upper portion of the combined fractionating and flash tower 22 as reflux liquid. The rest of the distillate is passed through line 190 into the primary fractionating zone 28 of the combined evaporator and fractionating zone 16 above the point of introduction of the heavy charging oil through line 48. Some of the introduced distillate is vaporized and some of the vapors in the primary fractionating zone 18 are condensed to form heavy reflux condensate. The unvaporized portions of the distillate and reflux condensate are collected on trap-out tray 38 together with the unvaporized portions of the heavy charging oil and passed to the cracking zone 12 maintained under mild cracking conditions in order to effect viscosity-breaking of the oil as hereinbefore described.

The naphtha, gas oil and heavy charging oil such as reduced crude oil above referred to can be obtained from a single source as by distilling a crude oil in a separate stripping tower. Or the naphtha, gas oil and heavy charging oil may be obtained from different stocks.

If desired, the furnaces or heaters shown separately as 132, 60 and 88 may be combined into one or more furnaces and the cracking zones can be arranged in the furnace or furnaces to bring about the desired heating.

While I have shown the separating zone 26 and evaporator zone 24 in one tower, it is to be understood that these zones may be separate vessels and the vapors from the evaporator zone are passed to the separating zone as above described.

While I have described a particular embodiment of my invention, it is to be expressly understood that my invention is not restricted thereto, and various modifications and adaptations thereof may be made without departing from the spirit of my invention.

I claim:

1. A process for converting higher boiling hydrocarbons into lower boiling hydrocarbons which comprises separating cracked products produced as hereinafter specified into vapors and residue in a separating zone and passing resultant separated vapors to primary, secondary and tertiary fractionating zones in succession, maintaining superatmospheric pressure in said separating and fractionating zones, introducing heavy charging stock into the secondary fractionating zone whereby a portion of the vapors therein is condensed and a portion of the charging stock is vaporized, collecting resultant reflux condensate and unvaporized charging stock and passing the same to a cracking zone wherein the oil is subjected to cracking temperature to effect cracking and produce viscosity-breaking of the heavy constituents thereof, delivering resultant cracked and viscosity-broken products into the primary fractionating zone wherein separation of vapors from cracked residue occurs and resultant separated vapors are added to the vapors flowing to the succeeding fractionating zones, subjecting vapors in the tertiary fractionating zone to fractionation to form a desired distillate product and reflux condensate, passing reflux condensate from the tertiary fractionating zone to a second cracking zone wherein the condensate is subjected to cracking temperature under superatmospheric pressure to effect conversion into lower boiling hydrocarbons, delivering resultant cracked products into the aforesaid separating zone as the cracked products hereinabove mentioned, passing resultant residue comprising residual constituents of cracking from said separating zone into a lower pressure flash zone wherein separation of vapors from liquid residue takes place, passing cracked residue from the primary fractionating zone to a separate lower pressure flash zone in which separation of vapors from liquid residue takes place, and combining vapors evolved in the first flash zone with vapors evolved in the second flash zone and subjecting the combined vapors to dephlegmation and condensation to form condensate.

2. A process for converting higher boiling hydrocarbons into lower boiling hydrocarbons which comprises separating cracked products produced as hereinafter specified into vapors and residue in a separating zone and passing resultant separated vapors to primary, secondary and tertiary fractionating zones in succession, maintaining superatmospheric pressure in said separating and fractionating zones, introducing heavy charging stock into the secondary fractionating zone whereby a portion of the vapors therein is condensed and a portion of the charging stock is vaporized, collecting resultant reflux condensate and unvaporized charging stock and passing the same to a cracking zone wherein the oil is subjected to cracking temperature to effect cracking and produce viscosity-breaking of the heavy constituents thereof, delivering resultant cracked and viscosity-broken products into the primary fractionating zone wherein separation of vapors from cracked residue occurs and resultant separated vapors are added to the vapors flowing to the succeeding fractionating zones, subjecting vapors in the tertiary fractionating zone to fractionation to form a desired distillate product and reflux condensate, passing reflux condensate from the tertiary fractionating zone to a second cracking zone wherein the condensate is subjected to cracking temperature under superatmospheric pressure to effect conversion into lower boiling hydrocarbons, delivering resultant cracked products into the aforesaid separating zone as the cracked products hereinabove mentioned, passing resultant residue comprising residual constituents of cracking from said separating zone into a lower pressure flash zone wherein separation of vapors from liquid residue takes place, passing the separated vapors into a separate low pressure fractionating and separating zone, delivering cracked residue from the primary fractionating zone to said low pressure separating and fractionating zone in contact with vapors introduced from said flash zone, subjecting the products in the low pressure separating and fractionating zone to fractionation to form a distillate product and a residual product comprising residual constituents derived from the primary fractionating zone and directing resultant distillate to the secondary fractionating zone wherein it is subjected to partial vaporization so that unvaporized portions are combined with the mixture of reflux condensate and unvaporized charging stock passing to the first-mentioned cracking zone while vaporized portions are combined with the vapors passing to the tertiary fractionating zone.

3. A process for converting higher boiling hydrocarbons into lower boiling hydrocarbons which comprises separating cracked products produced as hereinafter specified into vapors and residue in a separating zone and passing resultant separated vapors to primary, secondary and tertiary fractionating zones in succession, maintaining superatmospheric pressure in said separating and fractionating zones, introducing heavy charging stock into the secondary fractionating zone whereby a portion of the vapors therein is condensed and a portion of the charging stock is vaporized, collecting resultant reflux condensate and unvaporized charging stock and passing the same to a cracking zone wherein the oil is subjected to cracking temperature to effect cracking and produce viscosity-breaking of the heavy constituents thereof, delivering resultant cracked and viscosity-broken products into the primary fractionating zone wherein separation of vapors from cracked residue occurs and resultant separated vapors are added to the vapors flowing to the succeeding fractionating zones, subjecting vapors in the tertiary fractionating zone to fractionation to form a desired distillate product and reflux condensate, passing reflux condensate from the tertiary fractionating zone to a second cracking zone wherein the condensate is subjected to cracking temperature under superatmospheric pressure to effect conversion into lower boiling hydrocarbons, delivering resultant cracked products into the aforesaid separating zone as a portion of the cracked products hereinabove mentioned, passing a naphtha stock through a separate reforming zone wherein the naphtha is subjected to a temperature adequate to effect reformation into a product of increased anti-knock quality, delivering the resultant reformed products into the aforesaid separating zone as another portion of the cracked products hereinabove mentioned, passing resultant residue comprising residual constituents of cracking from said separating zone into a lower pressure flash zone wherein separation of vapors from liquid residue takes place, passing liquid residue from the primary fractionating zone to a separate lower pressure flash zone in which separation of vapors from liquid residue takes place, and combining vapors evolved in the first flash zone with vapors evolved in the second flash zone and subjecting the combined vapors to dephlegmation and condensation to form condensate.

PERCIVAL C. KEITH, Jr.